US010713297B2

(12) United States Patent
Bostick et al.

(10) Patent No.: US 10,713,297 B2
(45) Date of Patent: Jul. 14, 2020

(54) CONSOLIDATING VIDEO SEARCH FOR AN EVENT

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 16/127,959

(22) Filed: Sep. 11, 2018

(65) Prior Publication Data

US 2019/0012383 A1 Jan. 10, 2019

Related U.S. Application Data

(63) Continuation of application No. 14/470,041, filed on Aug. 27, 2014, now Pat. No. 10,102,285.

(51) Int. Cl.
*G06F 16/78* (2019.01)
*G06F 16/951* (2019.01)
*G06F 16/40* (2019.01)

(52) U.S. Cl.
CPC .............. *G06F 16/78* (2019.01); *G06F 16/40* (2019.01); *G06F 16/951* (2019.01)

(58) Field of Classification Search
CPC ......... G06F 16/78; G06F 16/951; G06F 16/40
See application file for complete search history.

(56) References Cited

U.S. PATENT DOCUMENTS 5,893,062 A * 4/1999 Bhadkamkar .......... G11B 27/10
   348/E5.009
5,940,573 A * 8/1999 Beckwith ............. G11B 27/034
   386/285

(Continued)

FOREIGN PATENT DOCUMENTS

EP   1585128   10/2005
EP   2262244   12/2010

(Continued)

OTHER PUBLICATIONS

Apple Inc., "Final Cut Pro X User Guide" 2013, Apple Inc.*

(Continued)

*Primary Examiner* — Jay A Morrison
*Assistant Examiner* — Huen Wong
(74) *Attorney, Agent, or Firm* — James Nock; Andrew D. Wright; Roberts Calderon Safran & Cole, P.C.

(57) ABSTRACT

A method of searching for videos includes receiving, by a computer device, a search query from a user computer device. The method also includes determining, by the computer device, a set of videos that satisfy the search query. The method further includes determining, by the computer device, a subset of related videos from the set using metadata to determine a relationship based on date, time, and location. The method additionally includes generating, by the computer device, a consolidated video from the subset of related videos by merging a first portion of a first one of the subset of related videos with a second portion of a second one of the subset of related videos.

20 Claims, 6 Drawing Sheets

(56) References Cited

U.S. PATENT DOCUMENTS

| | | | |
|---|---|---|---|
| 6,970,639 B1 | 11/2005 | McGrath et al. | |
| 8,457,466 B1* | 6/2013 | Sharma | H04N 7/181 |
| | | | 386/224 |
| 8,510,375 B2 | 8/2013 | Bouazizi | |
| 8,625,032 B2 | 1/2014 | Chitnis et al. | |
| 8,917,355 B1 | 12/2014 | Mo et al. | |
| 9,870,800 B2 | 1/2018 | Bostick et al. | |
| 2002/0069218 A1 | 6/2002 | Sull et al. | |
| 2003/0002851 A1 | 1/2003 | Hsiao et al. | |
| 2004/0143604 A1 | 7/2004 | Glenner et al. | |
| 2005/0091597 A1 | 4/2005 | Ackley | |
| 2006/0010383 A1 | 1/2006 | Tanaka et al. | |
| 2007/0110399 A1 | 5/2007 | Roh | |
| 2008/0059510 A1 | 3/2008 | Cardamore et al. | |
| 2008/0145034 A1 | 6/2008 | Barton | |
| 2008/0154889 A1* | 6/2008 | Pfeiffer | G06F 16/738 |
| 2009/0262206 A1* | 10/2009 | Park | G08B 13/19641 |
| | | | 348/218.1 |
| 2009/0309987 A1 | 12/2009 | Kimura et al. | |
| 2010/0077289 A1 | 3/2010 | Das et al. | |
| 2010/0092037 A1 | 4/2010 | Peleg et al. | |
| 2010/0122208 A1 | 5/2010 | Herr et al. | |
| 2010/0281382 A1 | 11/2010 | Meaney et al. | |
| 2011/0141227 A1* | 6/2011 | Bigioi | H04N 13/106 |
| | | | 348/36 |
| 2011/0225156 A1 | 9/2011 | Pavlik | |
| 2012/0163770 A1 | 6/2012 | Kaiser et al. | |
| 2012/0210220 A1* | 8/2012 | Pendergast | G06F 3/0482 |
| | | | 715/716 |
| 2012/0210222 A1* | 8/2012 | Matsuda | G11B 27/034 |
| | | | 715/716 |
| 2012/0210230 A1* | 8/2012 | Matsuda | G11B 27/034 |
| | | | 715/723 |
| 2012/0236201 A1 | 9/2012 | Larsen et al. | |
| 2013/0007043 A1 | 1/2013 | Phillips et al. | |
| 2013/0007620 A1 | 1/2013 | Barsook et al. | |
| 2013/0013583 A1 | 1/2013 | Yu et al. | |
| 2013/0104042 A1* | 4/2013 | Meaney | G06F 3/048 |
| | | | 715/716 |
| 2013/0188923 A1 | 7/2013 | Hartley et al. | |
| 2013/0195422 A1 | 8/2013 | Patil et al. | |
| 2013/0223343 A1 | 8/2013 | Wentink et al. | |
| 2014/0101551 A1 | 4/2014 | Sherrets et al. | |
| 2015/0169542 A1 | 6/2015 | Lin | |
| 2015/0293995 A1 | 10/2015 | Chen et al. | |
| 2015/0365716 A1 | 12/2015 | Fonseca, Jr. et al. | |
| 2016/0063103 A1 | 3/2016 | Bostick et al. | |
| 2016/0261930 A1 | 9/2016 | Kim | |
| 2018/0053532 A1 | 2/2018 | Bostick et al. | |

FOREIGN PATENT DOCUMENTS

| | | |
|---|---|---|
| WO | 0160054 | 8/2001 |
| WO | 2012151651 | 11/2012 |

OTHER PUBLICATIONS

Anonymous, "Advanced Video Management Systems", IPCOM00191225D, Dec. 22, 2009; 21 pages.

Baugher et al, "Method to Deliver Scalable Video Across a Distributed Computer System", IPCOM000112441D, Mar. 27, 2005; 7 pages.

Lindsay et al, "RFID Locating Systems for Linking Valued Objects with Multimedia Files", IPCOM000021113D, Dec. 23, 2003; 15 pages.

List of IBM Patents or Patent Applications Treated as Related, dated Sep. 11, 2018, 1 page.

Final Office Action from U.S. Appl. No. 15/798,600 dated Nov. 26, 2018, 9 pages.

Notice of Allowance from U.S. Appl. No. 15/798,600 dated Feb. 13, 2019, 5 pages.

* cited by examiner

CONSOLIDATING VIDEO SEARCH FOR AN EVENT

FIELD OF THE INVENTION

The present invention generally relates to video playback, and more particularly, to a method and system of searching for and playing related videos.

BACKGROUND

Video hosting services include websites and/or mobile applications where users can upload video content to share with others. Users generally upload their video content via the hosting service's website, mobile or desktop applications or APIs. The video host stores the video on its server and may provide the uploading user with different types of embed codes or links to allow others to view the video. Video hosting websites also permit other users to search for and play uploaded videos using search queries.

Video hosting services are very popular, with some sites experiencing upwards of 100 hours of video being uploaded each minute and six billion hours of video being watched each month. With such a vast amount of uploaded video data, a user search query may return numerous results of discrete videos that can be viewed individually.

SUMMARY

In a first aspect of the invention, there is a method of searching for videos. The method includes receiving, by a computer device, a search query from a user computer device. The method also includes determining, by the computer device, a set of videos that satisfy the search query. The method further includes determining, by the computer device, a subset of related videos from the set using metadata to determine a relationship based on date, time, and location. The method additionally includes generating, by the computer device, a consolidated video from the subset of related videos by merging a first portion of a first one of the subset of related videos with a second portion of a second one of the subset of related videos.

In another of the invention, there is a computer program product for searching for videos. The computer program product includes a computer readable storage medium having program instructions embodied therewith. The program instructions are executable by a computer device to cause the computer device to: determine, by the computer device, a set of videos that satisfy a search query; determine, by the computer device, a subset of videos from the set by using metadata to determine a relationship based on date, time, and location; and generate, by the computer device, a consolidated video from the subset of related videos by merging a first portion of a first one of the subset of related videos with a second portion of a second one of the subset of related videos.

In a further aspect of the invention, there is a computer system for searching for videos. The system includes a CPU, a computer readable memory and a computer readable storage medium. Additionally, the system includes one or more program instructions. The program instructions are operable to: determine a set of videos that satisfy a search query based on matching words in the search query to words associated with ones of a stored plurality of uploaded videos; determine a subset of videos from the set by using metadata to determine a relationship based on date, time, and location, wherein the metadata includes at least one of: video capture date, video capture time, video capture location, video capture direction, video title, and video description; and generate a consolidated video from the subset of related videos by merging a first portion of a first one of the subset of related videos with a second portion of a second one of the subset of related videos. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
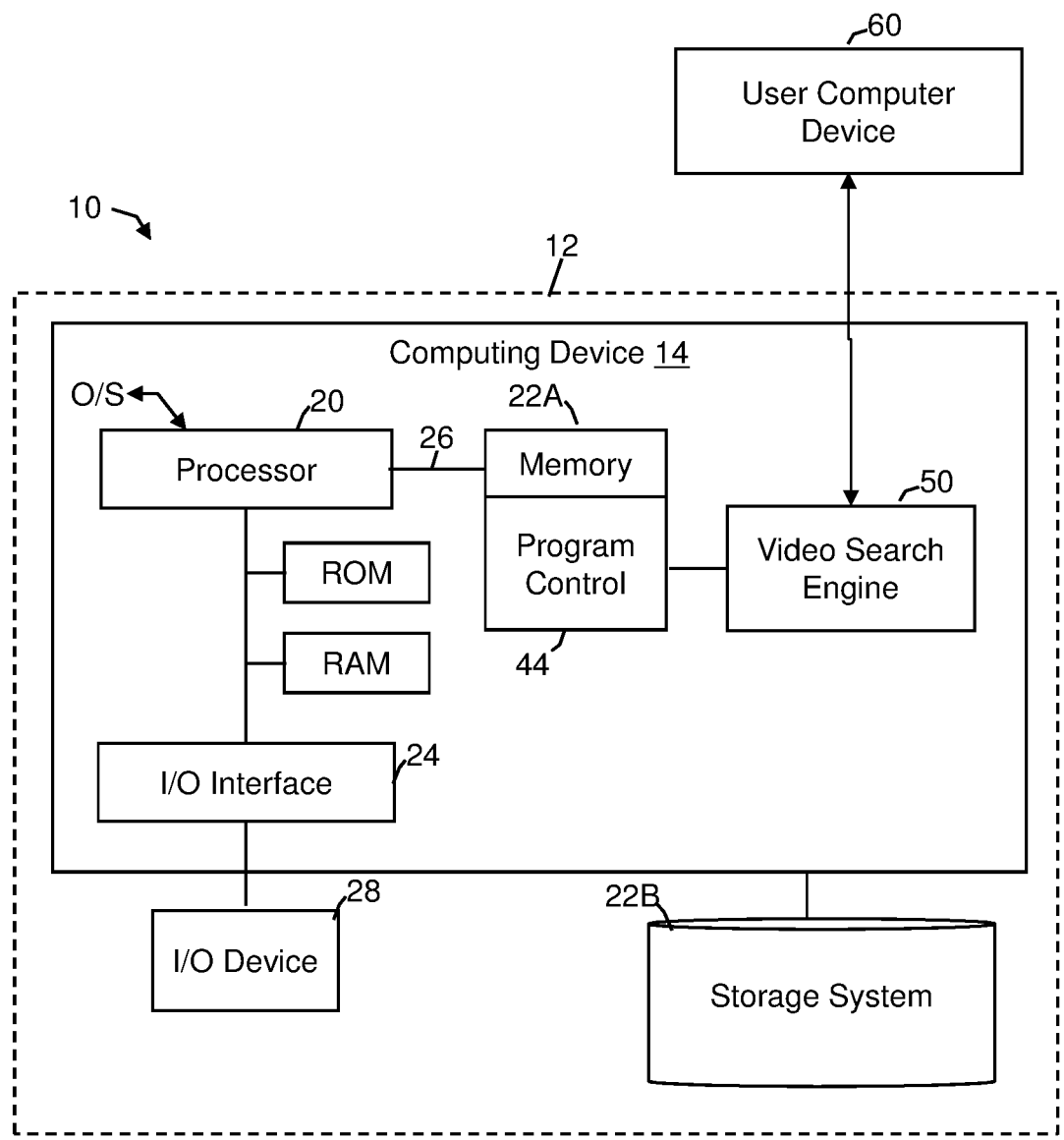
FIG. 1 is an illustrative environment for implementing the steps in accordance with aspects of the invention.

The present invention generally relates to video playback, and more particularly, to a method and system of searching for and playing related videos. In accordance with aspects of the invention, a video hosting service receives a search request, identifies related videos based on the search request, and combines the identified videos together in a time-based approach or a location-based approach. In embodiments, the identifying and combining videos is based on metadata associated with each video, such as location, date, time, direction, title, and description of the video. In this manner, implementations of the invention provide a consolidated video to a user based on a search request, wherein the consolidated video includes portions of plural previously uploaded videos.

Aspects of the present invention merge video files that are directed toward a similar subject. An embodiment of the present invention receives a search query and generates a set of video file search results. In embodiments, the present invention selects a subset of video files directed toward the same subject matter and arranges the video files in chronological order based on metadata of each video file. The metadata including the location, time, and direction of the uploaded video. In embodiments, the present invention determines whether overlapping scenes exist between the videos, and if so, removes at least one overlapping scene to prevent redundancy. In embodiments, the present invention merges the video files into a consolidated video file and presents the consolidated video file to the user. Further embodiments of the present invention arrange the video files according to each video file's recorded location metadata and place each of the video files in proximity to each other, in order to create a consolidated video file with a panoramic view.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a video search engine 50, e.g., that performs one or more of the processes described herein. The video search engine 50 can be implemented as one or more program code in program control 44 stored in memory 22A as separate or combined modules. Additionally, video search engine 50 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

The video search engine 50 is configured to receive a search request from a user computer device 60, determine video files that satisfy the search request, and communicate the search results (i.e., the determined video files) to user computer device 60 for display to the user. The video files that satisfy the search request may be determined, in part, by comparing aspects of the search request to data associated with each video file as is understood by those of skill in the art such that further explanation is not necessary. The user computer device 60 may be any suitable computing device, such as a desktop computer, laptop computer, tablet computer, smartphone, etc. The user computer device 60 may display a user interface (UI) that is associated with video search engine 50, e.g., via a browser and/or mobile application. The UI may include an area for the user to input the search query, an area for displaying the search results, and an area for displaying videos. Video search engine 50 may communicate with and provide unique search results to plural different user computer devices 60. The communication between video search engine 50 and user computer device(s) 60 may be over any suitable network, such as the Internet.

According to aspects of the invention, video search engine 50 is configured to consolidate plural videos of a search result into a single video file and to communicate the consolidated video to user computer device 60 with the search results. In this manner, the user may select (i.e., play) one or more of the individual videos from the search results, or may select the consolidated video.

In embodiments, plural videos of a search result are consolidated based on metadata associated with each of the individual video files. The metadata may include, but is not limited to, video capture date, video capture time, video capture location, video capture direction, video title, and video description. Video capture date and video capture time metadata may be appended to a video file by a computer device used to capture the video, e.g., based on the date and time settings of the computer device (e.g., smartphone) that is used to capture the video. Video capture location metadata may be appended to the video file by the computer device used to capture the video, e.g., based on the location data of the computer device when the video is captured. The location data of the computer device may be based on GPS (Global Positioning System), triangulation, or similar data. Video capture direction metadata may be appended to the video file by the computer device used to capture the video, e.g., based on the compass direction of the computer device when the video is captured. Video title and video description metadata may be appended to the video file by a user, e.g., via the computer device used to capture the video or via a website or application associated with video search engine 50. In some instances, the metadata may be automatically included with a video file when the video file is uploaded to the video hosting service. Additionally or alternatively, the metadata may be input by a user for a particular uploaded video, e.g., via an interface provided by the video hosting service.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
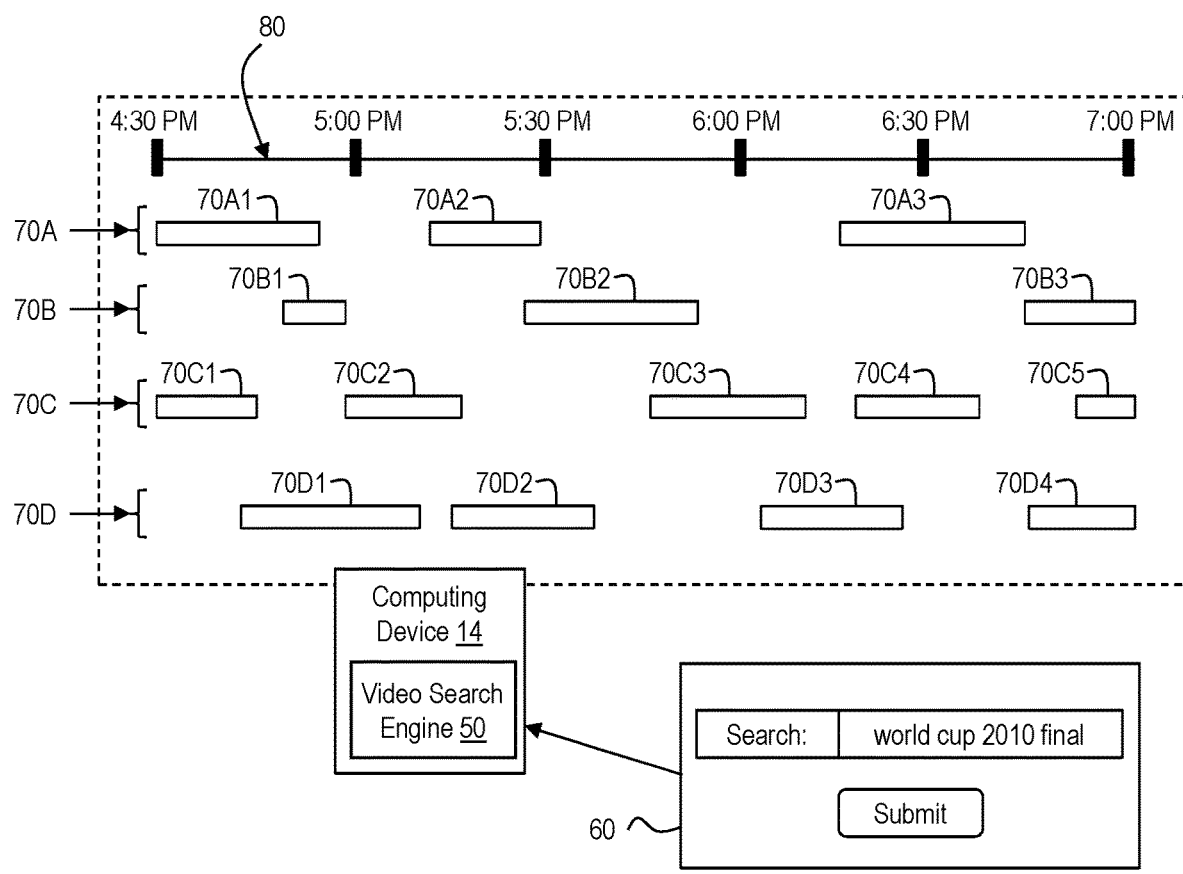
FIGS. 2 and 3 show block diagrams in accordance with aspects of the invention.

FIG. 2 shows a block diagram of receiving a search query and searching for related videos in accordance with aspects of the invention. In embodiments, a user of a user computer device 60 inputs and submits a search query (e.g., "world cup 2010 final"). User computer device 60 transmits the search query to video search engine 50 running on computing device 14. Video search engine 50 searches a data store of uploaded videos and generates search results that are represented by videos 70A-D. For example, video 70A represents a first video that was captured by a user and uploaded to a video hosting service that is accessible and searchable by video search engine 50. Similarly, videos 70B, 70C, and 70D represent respective second, third, and fourth videos that have been uploaded to the same video hosting service.

In the example depicted in FIG. 2, videos 70A-D are determined by video search engine 50 as satisfying the search query and being captured from a same time and location. In embodiments, video search engine 50 determines the time and location based on metadata associated with each of videos 70A-D. The metadata may include video capture date, video capture time, video capture location, video capture direction, video title, and video description. For example, video search engine 50 may receive a search query "world cup 2010 final". In response to this search query, video search engine 50 may use one or more conventional search processes to identify a set of videos that satisfy the search, and then additionally determine using metadata that a subset (e.g., videos 70A-D) of the set of videos were captured at a same time and location.

As used herein, the phrase "same time" may include a range of time. For example, videos 70A-D are shown plotted against a timeline 80 that extends from 4:30 PM to 7:00 PM on the same day. Videos 70A-D are deemed to be at the same time since each video has a portion that falls within this range of time. Any desired range of time (and date) may be used. The range of time may be defined by a user and stored as a setting of the search engine. In some embodiments, the range of time may be input by the user as a parameter of the search query.

As used herein, the phrase "same location" may include a range of locations. When GPS metadata is used, the range of locations may be GPS locations that are within a predefined distance of one another. For example, video 70A may be deemed to be at the same location as video 70B when the GPS video capture location of video 70A is within the predefined distance of the GPS video capture location of video 70B. The predefined distance may be defined by a user and stored as a setting of the video search engine. In some embodiments, the predefined distance may be input by the user as a parameter of the search query.

With continued reference to FIG. 2, each one of videos 70A-D is discontinuous along the timeline 80. Specifically, video 70A was captured from 4:30 PM to 4:55 PM (portion 70A1), and then restarted from 5:15 PM to 5:30 PM (portion 70A2), and again from 6:15 PM to 6:45 PM (portion 70A3). Similarly, video 70B includes discontinuous portions 70B1, 70B2, 70B3, video 70C includes discontinuous portions 70C1, 70C2, 70C3, 70C4, 7005, and video 70D includes discontinuous portions 70D1, 70D2, 70D3, 70D4. The start and stop times associated with each video (and video portion) are defined by metadata associated with each video.

Figure 3:
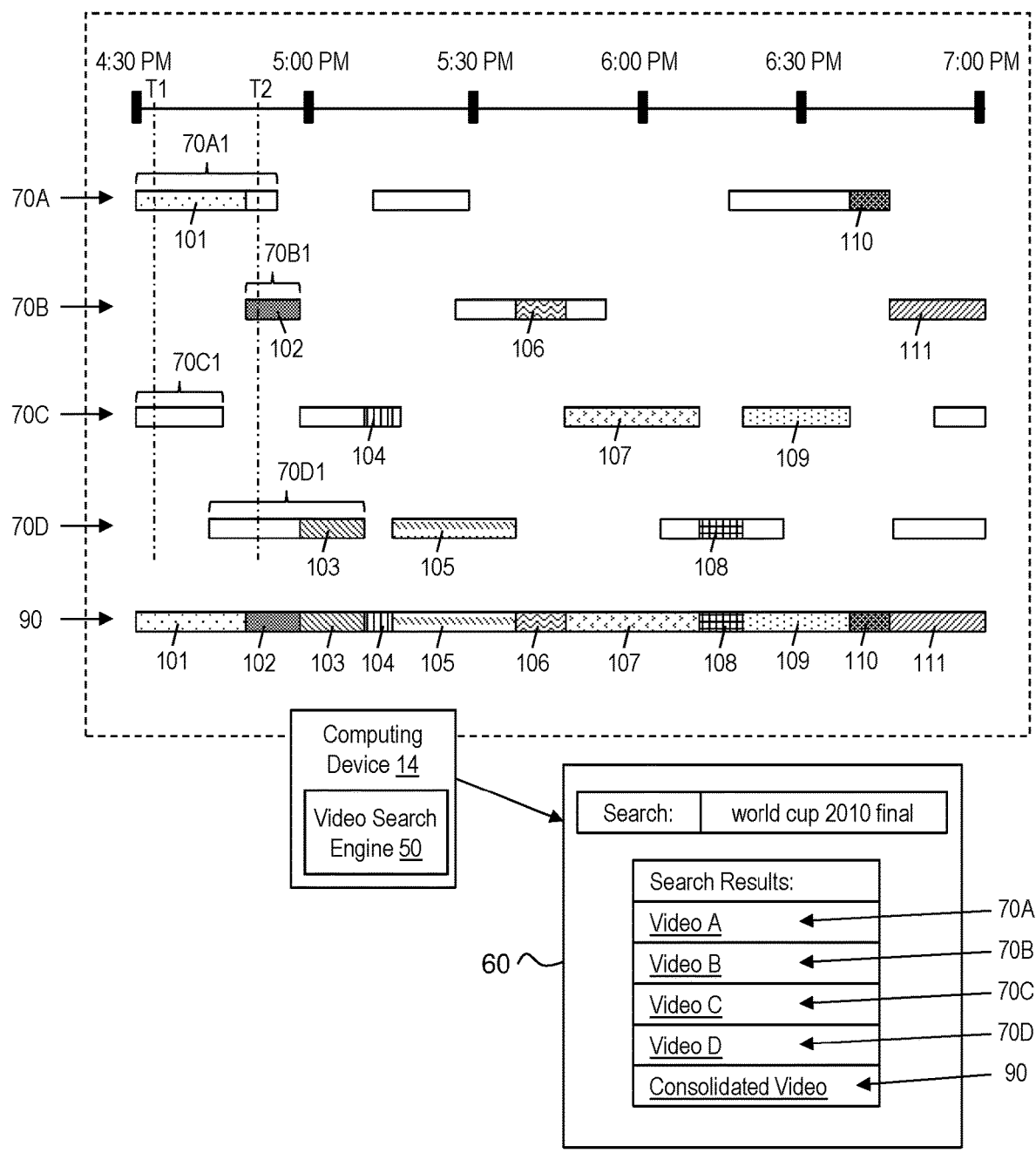

As shown in FIG. 3, video search engine 50 is configured to generate a consolidated video 90 using portions of videos 70A-D. In embodiments, video search engine 50 arranges portions of videos 70A-D in a chronological sequence, determines overlapping portions, determines a top ranked video portion among any overlapping portions, and uses the top ranked portion in consolidated video 90. For example, at time T1 there are two overlapping portions: portion 70A1 and portion 70C1. Video search engine 50 uses ranking criteria to rank the overlapping portions and determine a higher ranked portion for inclusion in consolidated video 90. In this example, portion 70A1 has a higher rank than portion 70C1 such that portion 101 from portion 70A1 is placed into consolidated video 90. Similarly, at time T2 there are three overlapping portions: portion 70A1, portion 70B1, and portion 70D1. In this example, portion 70B1 has a higher rank than portions 70A1 and 70D1 such that portion 102 from portion 70B1 is placed into consolidated video 90.

The respective rankings of overlapping portions may be determined in any suitable manner using any desired metric (s). For example, rankings may be determined based on parameters such as: popularity (e.g., number of previous views of each video portion by other users of the video hosting service); video type (e.g., high definition versus standard definition); and video quality (e.g., as determined by video quality analysis tools). In some embodiments, combinations of more than one of these (or other) parameters may be used to determine a composite ranking for each video portion.

With continued reference to FIG. 3, consolidated video 90 includes portions 101-111 from videos 70A-D. Generating consolidated video 90 may include combining portions 101-111 in chronological order in a single video file using digital editing processes. In this manner, when consolidated video 90 is played, each subsequent portion (e.g., portion 102) automatically begins playing at the conclusion of the pervious portion (e.g., portion 101). Accordingly, consolidated video 90 represents a single video file that is presented as part of the search result to the user (i.e., the person that performed the search query). From the search results list displayed at user computer device 60, the user can opt to play consolidated video 90 or any of individual videos 70A-D included in the search result list.

Figure 4:
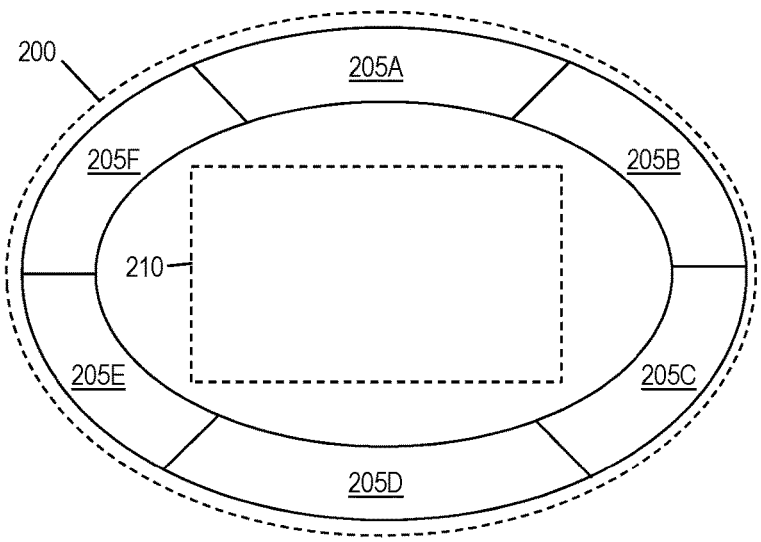
FIG. 4 shows a diagram of plural locations in accordance with aspects of the invention.

FIG. 4 shows a diagram that illustrates an embodiment that utilizes an additional parameter in determining related videos in a search result. As depicted in FIG. 4, area 200 represents a location that is divided into smaller locations 205A-F. Area 200 may represent, for example, a sports stadium such as a soccer stadium. Locations 205A-F may represent, for example, different seating sections within the stadium and around a field 210. A video captured by a user in location 205A has a different point of view of the field 210 than that of a video captured by a user in location 205C. In accordance with aspects of the invention, the video search engine takes into account metadata including video capture location within a larger area and/or video capture direction when organizing search results of a search query.

Still referring to FIG. 4, consider an example in which plural users attend a sporting event (e.g., the final match of the 2010 world cup) at a stadium (e.g., area 200) and use their mobile devices (e.g., smartphones, tablet computers, etc.) to capture videos of the sporting event as it is being played on field 210. A first set of users are seated in location 205A and capture plural videos from this location. Similarly, other respective sets of users are seated in respective locations 205B-F and capture videos from these respective locations. When all the users upload their videos to the video hosting service, each video includes metadata such as video capture date, video capture time, video capture location, video capture direction, video title, and video description.

In embodiments, in response to a search query, the video search engine (e.g., video search engine 50) is configured to define subsets of videos of a search result based on video capture location and/or video capture direction. For example, in response to a user submitting a search query, the video search engine may be configured to: use one or more conventional search processes to identify a set of videos that satisfy the search query; and use metadata to determine plural subsets of videos that were captured within a same date and time range and within respective locations and/or having same respective video capture directions. Specifically, metadata associated with video capture location and/or video capture direction may be used to define plural subsets of videos within a search result, as opposed to a single subset of videos as described with respect to FIGS. 2 and 3.

For example, with continued reference to FIG. 4, in response to a user submitting a search query of "world cup 2010 final", the video search engine may be configured to determine a first set of videos that satisfy the search query using one or more conventional search processes. The video search engine may be configured to determine an intermediate subset of the first set using the approach described with respect to FIGS. 2 and 3, e.g., identifying videos of the first set that have a video capture location (e.g., GPS location) within area 200 and that have a video capture date and time within a predefined time range (e.g., 4:30 PM to 7:00 PM on a particular day). The video search engine may be configured to determine plural subsets of videos of the intermediate subset based on video capture location and/or video capture direction metadata. For example, the video search engine may define the subsets by grouping together videos that have a similar video capture direction, e.g., as defined by a range of compass directions. As another example, the video search engine may define the subsets by grouping together videos that have a similar video capture location, e.g., as defined by a range of distance within larger area 200.

Figure 5:
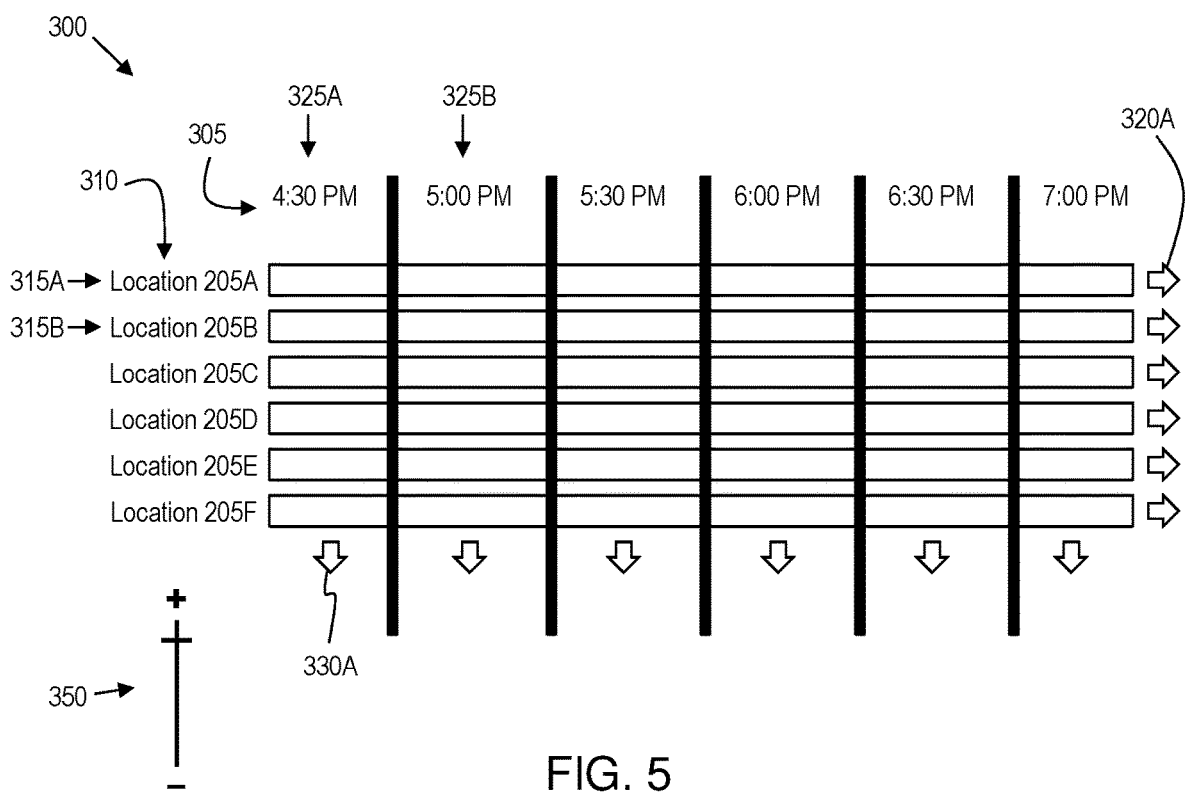
FIG. 5 shows an exemplary interface in accordance with aspects of the invention.

FIG. 5 shows a two-dimensional matrix 300 for displaying search results in accordance with aspects of the invention. In embodiments, matrix 300 is a user interface that is generated by the video search engine (e.g., video search engine 50) and is communicated to and displayed on the user computer device (e.g., user computer device 60). In embodiments, matrix 300 is based on the plural subsets of videos that are determined as a result of a search query as described with respect to FIG. 4. A first axis 305 of matrix 300 shows time and a second axis 310 of matrix 300 shows respective locations associated with the plural subsets of videos. For example, row 315A represents the subset of videos associated with location 205A, row 315B represents the subset of videos associated with location 205B, and so on. In embodiments, each row (e.g., 315A, 315B, etc.) includes a respective user-selectable input (e.g., arrow icon 320A) that, when selected by a user via an interface at the user computer device, causes the video search engine to generate a consolidated video from the particular subset of videos in a manner similar to that described with respect FIG. 3. For example, when a user selects arrow icon 320A, the video search engine generates a consolidated video from the subset of videos associated with location 205A (e.g., in the manner described with respect to FIG. 3), and provides the consolidated video to the user computer device for playing to the user.

Still referring to FIG. 5, in embodiments each column (e.g., 325A, 325B, etc.) includes a respective user-selectable input (e.g., arrow icon 330A) that, when selected by a user via an interface at the user computer device, causes the video search engine to generate a panoramic video from the plural subsets of videos for the selected time. For example, when a user selects arrow icon 330A, the video search engine generates a panoramic video using respective video portions from each location 205A-F at the time of 4:30 PM, and provides the panoramic video to the user computer device for playing to the user.

With continued reference to FIG. 5, matrix 300 may include a user-selectable meter 350 that changes a level of granularity that defines the number of subsets of videos and, hence, the number of rows of matrix 300. For example, as shown in FIGS. 4 and 5, there are six locations 205A-F that correspond to six subsets of videos in the search result. The user may manipulate meter 350 to increase or decrease the number of locations. For example, a user may manipulate meter 350 to select two locations instead of six locations. Based on this input, the video search engine determines two subsets of videos from the intermediate subset based on video capture location and/or video capture direction metadata, and provides a new matrix to the user computer device based on the determined two subsets. The meter 350 may take any suitable form, including but not limited to a slide bar.

As described herein, aspects of the invention plot out all search results for a specific event by time and location and create a consolidated video sequence. In embodiments, the video search engine automatically identifies location, direction and time aspects of video segments submitted by random users to the public domain. In embodiments, the video search engine automatically uses metadata to pull together the highest ranked videos for each specific time interval and form a continuous video based on criteria described herein. In embodiments, the video search engine also uses the direction of capture in order to splice together a panoramic video of one (or more) specific time intervals.

In one embodiment, the results are shown as a two dimensional matrix based on location and time. In this embodiment, the user is able to select the time axis or location axis in order to select a continuous segment or a panoramic view. In another embodiment, the two dimensional matrix is held in the background and the user can request a continuous video between certain times to be put together. In the embodiment when the two dimensional matrix is displayed to the user, scrolling capabilities are provided to adjust the granularity of the location, which is useful where a continuous video has gaps in time, in which case the user can scroll to a broader location granularity to get more hits in the creation of the continuous video.

Flow Diagram

Figure 6:
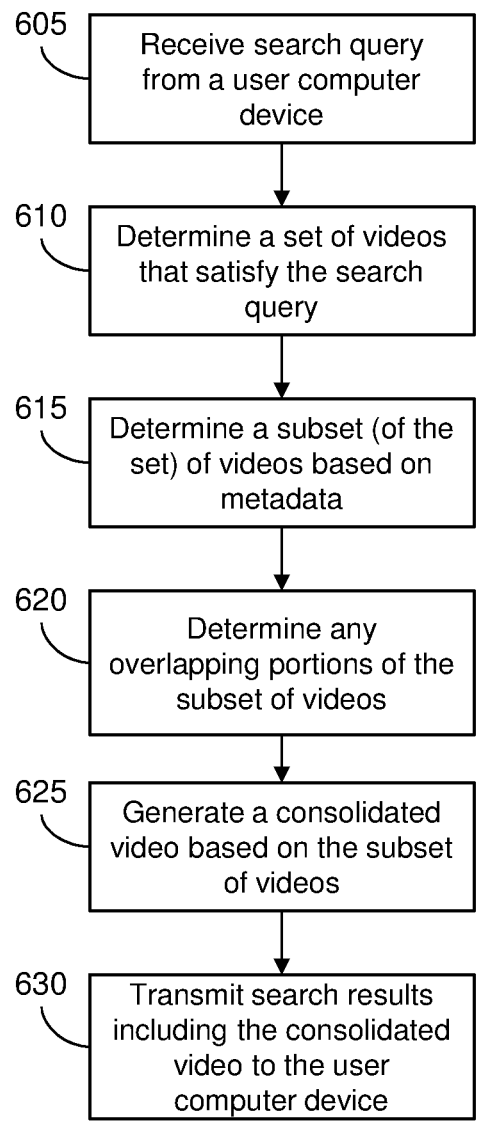
FIGS. 6 and 7 show exemplary flows in accordance with aspects of the invention.
Figure 7:
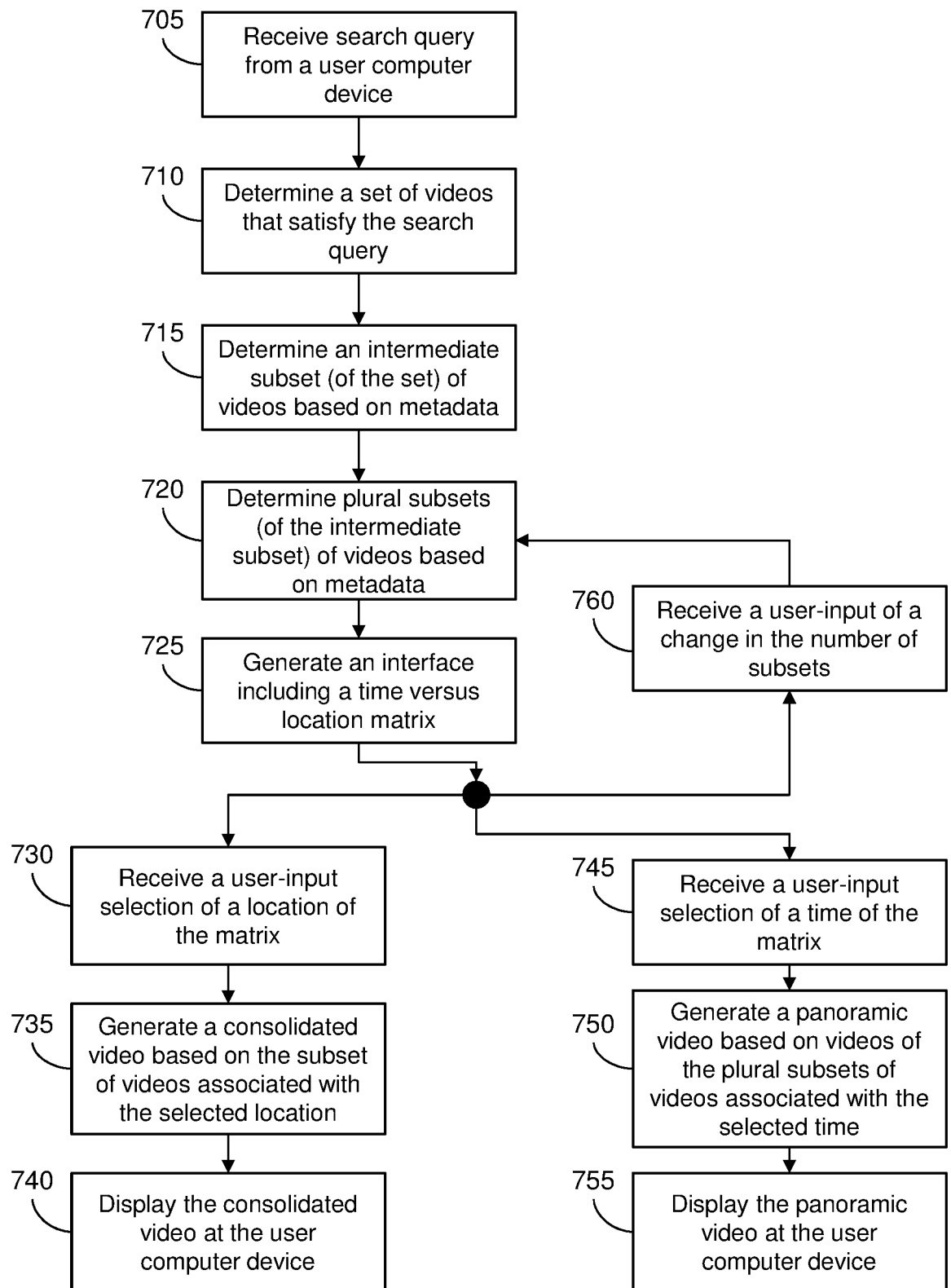

FIGS. 6 and 7 show exemplary flows for performing aspects of the present invention. The steps of FIGS. 6 and 7 may be implemented in the environment of FIG. 1, for example. As noted above, the flowchart(s) illustrate the architecture, functionality, and operation of possible implementations of systems, methods, and computer program products according to various embodiments of the present invention.

FIG. 6 depicts an exemplary flow for a process in accordance with aspects of the present invention. At step 605, a computer device (e.g., computing device 14 running video search engine 50) receives a search query from a user computer device (e.g., user computer device 60). Step 605 may be performed in the manner described with respect to FIG. 2. For example, the computer device running the video search engine may be part of, or communicate with, a video hosting service. The user computer device may access the video hosting service via a network connection. The search query may be input via a user interface that is presented at the user computer device and that is associated with the video hosting service.

At step 610, the computer device running the video search engine determines a set of videos that satisfy the search query. Step 610 may be performed in the manner described with respect to FIGS. 2 and 3. For example, the computer device running the video search engine may use one or more conventional search processes to determine the set of videos that satisfy the search query. Conventional search processes may include, for example, matching words in the search query to words in the title, description, and comments of each video stored by the hosting service.

At step 615, the computer device running the video search engine determines a subset (of the set) of videos based on metadata. Step 615 may be performed in the manner described with respect to FIGS. 2 and 3. For example, the computer device running the video search engine may use metadata associated with each one of the videos in the set to determine a subset of videos are related based on date, time, and location. The metadata may include, for example, video capture date, video capture time, video capture location, video capture direction, video title, and video description.

At step 620, the computer device running the video search engine determines any overlapping portions of the subset of videos. Step 620 may be performed in the manner described with respect to FIG. 3. For example, the computer device running the video search engine may use the data and time metadata associated with each video in the subset to determine if any of the videos have portions that overlap at a same time. When one or more overlapping portions are identified for a particular time slot, the computer device running the video search engine may rank the overlapping portions and identify a highest ranked portion for subsequent inclusion in a consolidated video at this particular time slot.

At step 625, the computer device running the video search engine generates a consolidated video based on the subset of videos. Step 625 may be performed in the manner described with respect to FIG. 3. For example, the computer device running the video search engine may combine non-overlapping portions of the videos of the subset in chronological order in a single video file. At time slots where overlapping portions were identified at step 620, the determined highest ranked portion is used in the consolidated video.

At step 630, the computer device running the video search engine transmits search results including the consolidated video to the user computer device. Step 630 may be performed in the manner described with respect to FIG. 3. For example, the computer device running the video search engine may transmit a list of search results to the user computer device. The list of search results may include any one or more of: the set of videos (from step 610); the subset of related videos (from step 615); and the consolidated video (from step 625). The search results may be displayed on the user computer device with a respective user-selectable input (e.g., a link, etc.) associated with each video in the search results. The user may cause any particular video to be played on the user computer device by selecting the user-selectable input associated with the particular video. Additionally or alternatively, the search results may include copies of the videos rather than links.

FIG. 7 depicts an exemplary flow for a process in accordance with aspects of the present invention. At step 705, a computer device (e.g., computing device 14 running video search engine 50) receives a search query from a user computer device (e.g., user computer device 60). At step 710, the computer device running the video search engine determines a set of videos that satisfy the search request. Steps 705 and 710 may be performed in a manner similar to steps 605 and 610, respectively.

At step 715, the computer device running the video search engine determines an intermediate subset of videos (of the set) based on metadata. Step 715 may be performed in the manner described with respect to FIGS. 4 and 5. For example, the computer device running the video search engine may determine the intermediate subset by identifying videos in the set that have the same date and time, and that are within a same relatively large location.

At step 720, the computer device running the video search engine determines plural subsets of videos (from the intermediate subset) based on metadata. Step 720 may be performed in the manner described with respect to FIGS. 4 and 5. For example, the computer device running the video search engine may determine the plural subsets by identifying groups of related in the intermediate subset that are related in terms of capture location and/or capture direction.

At step 725, the computer device running the video search engine generates an interface that includes a two-dimensional time versus location matrix. Step 725 may be performed in the manner described with respect to FIG. 5. For example, the computer device running the video search engine may generate a matrix (e.g., matrix 300) in which each row corresponds to one of the plural subsets determined at step 720. The interface including the matrix may be transmitted to the user computer device and displayed to the user.

At step 730, the computer device running the video search engine receives a user-input selection of a location of the matrix. At step 735, the computer device running the video search engine generates a consolidated video based on the subset of videos associated with the location that was selected at step 730. Steps 730 and 735 may be performed in the manner described with respect to FIG. 5. For example, when a user selects one of the rows of the matrix, the video search engine generates a consolidated video based on the subset of videos associated with the selected row. The consolidated video may be generated in the same manner as described with respect to steps 620 and 625 of FIG. 6. At step 740, the consolidated video is displayed on the user computer device.

At step 745, the computer device running the video search engine receives a user-input selection of a time of the matrix. At step 750, the computer device running the video search engine generates a panoramic video based on the selected time. Steps 745 and 750 may be performed in the manner described with respect to FIG. 5. For example, when a user selects one of the columns of the matrix, the video search engine generates a panoramic video based videos from plural ones of the plural subsets. At step 755, the panoramic video is displayed on the user computer device.

At step 760, after the interface is generated at step 725, the computer device running the video search engine may receive a user-input change of the number of subsets. Step 760 may be performed in the manner described with respect to FIG. 5. For example, the user may manipulate an input (e.g., a slide bar) at the user interface of the user computer device to change a granularity of the location-based search results. Upon receiving this input from the user computer device, the computer device running the video search engine may change the number of subsets based on the user input and return to step 720 to determine new subsets of videos.

In embodiments, the invention provides a method that performs the process of the invention on a subscription, advertising, and/or fee basis. That is, a service provider, such as a Solution Integrator, could offer to provide searching for and playing related videos functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for searching for and playing related videos. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computer device, a search query from a user computer device;
   determining, by the computer device, search results comprising a set of videos that satisfy the search query;
   automatically displaying, by the computer device, a matrix of the search results including a horizontal axis based on a first type of video metadata of the search results and a vertical axis based on a second type of video metadata of the search results;
   receiving, by the computer device, a user selected level of granularity that defines a number of rows of the matrix of search results;
   displaying, by the computer device, a first selectable icon enabling a user to select the horizontal axis of the matrix, wherein a selection of the first selectable icon results in the computer device generating a first type of consolidated video based on the first type of video metadata;
   displaying, by the computer device, a second selectable icon enabling the user to select the vertical axis of the matrix, wherein a selection of the second selectable icon results in the computer device generating a second type of consolidated video based on the second type of video metadata, wherein the first selectable icon and the second selectable icon are displayed simultaneously; and
   generating, by the computer device based on a user-input selection, the one of the first type of consolidated video or the second type of consolidated video from the set of videos by merging a first portion of a first one of the set of videos with a second portion of a second one of the set of videos, wherein a third portion of the first one of the set of videos overlapping with a fourth portion of the second one of the set of videos is excluded.

2. The computer-implemented of claim 1, wherein the video metadata includes at least one type of metadata selected from the group consisting of: video capture date, video capture time, video capture location, video capture direction, video title, and video description.

3. The computer-implemented of claim 1, wherein the video metadata includes all of the following types of metadata: video capture date, video capture time, and video capture location.

4. The computer-implemented of claim 1, wherein the merging comprises:
   combining the first portion and the second portion in a chronological order in the consolidated video using digital editing.

5. The computer-implemented method of claim 1, further comprising transmitting a search results list to the user computer device, wherein the search results list includes a link for playing the consolidated video.

6. The computer-implemented method of claim 1, wherein the first axis is based on video capture time metadata and the second axis is based on video capture location metadata.

7. The computer-implemented method of claim 6, further comprising:
   receiving the user-input selection of the second selectable icon; and
   wherein the generating the one of the first type of consolidated video or the second type of consolidated video comprises generating the second type of consolidated video comprising a continuous video for a location over a period of time.

8. The computer-implemented method of claim 6, further comprising:
   receiving the user-input selection of the first selectable icon; and
   wherein the generating the one of the first type of consolidated video or the second type of consolidated video comprises generating the first type of consolidated video comprising a panoramic video.

9. The method of claim 6, further comprising:
   determining, by the computer device, a plurality of subsets of related videos from the set of videos;
   wherein receiving the user selected level of granularity that defines the number of rows of the matrix of search results comprises receiving a user-input selection of a change in number of video capture locations indicated in the matrix; and
   determining, by the computing device based on the user-input selection, a new plurality of subsets of videos from the set, wherein the new plurality of subsets has a different number of subsets than the plurality of subsets.

10. A computer program product comprising a computer readable storage medium having program instructions embodied therewith, the program instructions being executable by a computer device to cause the computer device to:
    determine search results comprising a set of videos that satisfy a search query;
    define a number of rows of a matrix of the search results based on a user selected level of granularity, wherein the user selected level of granularity defines a subset of the set of videos to be displayed in the matrix;

automatically display the matrix of the search results including a first axis based on time and a second axis based on location;

display a first selectable icon enabling a user to select the first axis of the matrix, wherein a selection of the first selectable icon results in the computer device generating a first type of consolidated video based on time;

display a second selectable icon enabling the user to select the second axis of the matrix, wherein a selection of the second selectable icon results in the computer device generating a second type of consolidated video based on location, wherein the first selectable icon and the second selectable icon are displayed simultaneously;

receive a user-input selection to generate either the first type of consolidated video based on the time of the first axis or the second type of consolidated video based on the location of the second axis; and generate, based on the user-input selection, the first type of consolidated video or the second type of consolidated video from the set of videos by merging a first portion of a first one of the set of videos with a second portion of a second one of the set of videos, wherein a third portion of the first one of the set of videos overlapping with a fourth portion of the second one of the set of videos is excluded.

11. The computer program product of claim 10, wherein the program instructions are executable by the computer device to cause the computer device to:

determine a subset of related videos from the set of videos based on metadata;

determine the overlapping portions of the related videos contained in the subset of related videos;

rank the overlapping portions; and include a highest ranked one of the overlapping portions in the first type of consolidated video or the second type of consolidated video, wherein the highest ranked one of the overlapping portions comprises the first portion and the second portion.

12. The computer program product of claim 11, wherein the metadata includes at least one of: video capture date, video capture time, video capture location, video capture direction, video title, and video description.

13. The computer program product of claim 10, wherein the merging comprises:

combining the first portion and the second portion in a chronological order using digital editing.

14. A system for searching for videos, comprising:

a CPU, a computer readable memory and a computer readable storage medium;

program instructions to determine search results comprising a set of videos that satisfy a search query based on matching words in the search query to words associated with ones of a stored plurality of uploaded videos, wherein the set of videos includes one or more videos having overlapping portions;

program instructions to define a number of rows of a matrix of the search results based on a user selected level of granularity;

program instructions to automatically display the matrix of search results including a first axis based on a first type of metadata and a second axis based on a second type of metadata;

program instructions to display a first selectable icon enabling a user to select the first axis of the matrix, wherein a selection of the first selectable icon results in the computer device generating a first type of consolidated video;

program instructions to display a second selectable icon enabling the user to select the second axis of the matrix, wherein a selection of the second selectable icon results in the computer device generating a second type of consolidated video, wherein the first selectable icon and the second selectable icon are displayed simultaneously;

program instructions to receive a user-input selection to generate one of the first type of consolidated video or the second type of consolidated video; and program instructions to generate the one of the first type of consolidated video or the second type of consolidated video from the set of videos by merging a first portion of a first one of the set of videos with a second portion of a second one of the set of videos, wherein at least one of the overlapping portions is excluded from the consolidated video;

wherein the program instructions are stored on the computer readable storage medium for execution by the CPU via the computer readable memory.

15. The system of claim 14, wherein the first metadata includes at least one type of metadata selected from the group consisting of: video capture date, video capture time, video capture location, video capture direction, video title, and video description.

16. The system of claim 14, further comprising:

program instructions to determine a plurality of subsets of related videos from the set of videos using video metadata;

wherein the video metadata includes all of the following types of metadata: video capture date, video capture time, and video capture location.

17. The system of claim 14, wherein the merging comprises:

combining the first portion and the second portion in a chronological order in the first type of consolidated video or the second type of consolidated video using digital editing.

18. The system of claim 14, further comprising program instructions to transmit a search results list to the user computer device, wherein the search results list includes a link for playing the first type of consolidated video or the second type of consolidated video.

19. The system of claim 14, wherein the first axis is based on video capture time metadata and the second axis is based on video capture location metadata.

20. The system of claim 14, wherein:

the first type of consolidated video comprises a panoramic video; and the second type of consolidated video comprises a continuous video for a location over a period of time.

* * * * *